US010300568B2

(12) United States Patent
Kousens et al.

(10) Patent No.: US 10,300,568 B2
(45) Date of Patent: May 28, 2019

(54) COMPENSATING FACE PLATE VISE JAWS AND RELATED METHODS

(71) Applicant: Chicago Equipment Leasing Services Company, La Jolla, CA (US)

(72) Inventors: William Kousens, El Cajon, CA (US); Zachary Kousens, Carlsbad, CA (US); Tam Nguyen, San Diego, CA (US)

( * ) Notice: Subject to any disclaimer, the term of this patent is extended or adjusted under 35 U.S.C. 154(b) by 435 days.

(21) Appl. No.: 14/985,983

(22) Filed: Dec. 31, 2015

(65) Prior Publication Data

US 2017/0190007 A1 Jul. 6, 2017

(51) Int. Cl.
*B25B 1/24* (2006.01)
*B23Q 3/06* (2006.01)

(52) U.S. Cl.
CPC .............. *B23Q 3/061* (2013.01); *B25B 1/241* (2013.01); *B25B 1/2452* (2013.01); *B23Q 2703/08* (2013.01)

(58) Field of Classification Search
CPC .... B25B 1/00; B25B 1/02; B25B 1/08; B25B 1/2452; B25B 1/2457
See application file for complete search history.

(56) References Cited

U.S. PATENT DOCUMENTS

| | | | |
|---|---|---|---|
| 1,059,545 A | 4/1913 | Kunze | |
| 2,810,600 A | 10/1957 | Kendrick | |
| 3,077,346 A | 2/1963 | Lassy | |
| 4,632,374 A | 12/1986 | Yang | |
| 4,706,949 A * | 11/1987 | Dossey | B25B 1/24 269/283 |
| 4,898,371 A | 2/1990 | Mills et al. | |
| 5,078,372 A | 1/1992 | Fitzpatrick | |
| 6,022,010 A | 2/2000 | Bernstein | |
| 6,138,534 A * | 10/2000 | Cho | B25B 13/105 81/185 |
| 6,196,536 B1 * | 3/2001 | Hintze | B25B 1/103 269/266 |
| 6,361,035 B1 | 3/2002 | Collins | |
| 6,783,123 B2 * | 8/2004 | Guimont | B25B 1/2405 269/226 |
| 7,290,761 B2 * | 11/2007 | Siegel | B25B 1/08 269/266 |
| 8,998,190 B2 * | 4/2015 | Winn | B25B 1/24 269/271 |
| 2006/0055098 A1 * | 3/2006 | Siegel | B25B 1/2421 269/279 |
| 2006/0108729 A1 * | 5/2006 | Siegel | B25B 1/08 269/266 |
| 2017/0190007 A1 * | 7/2017 | Kousens | B23Q 3/061 |

FOREIGN PATENT DOCUMENTS

WO     WO 2017/116513 A1     7/2017

* cited by examiner

*Primary Examiner* — Lee D Wilson
(74) *Attorney, Agent, or Firm* — Buche & Associates, P.C.; John K. Buche; Bryce A. Johnson

(57) ABSTRACT

Disclosed generally is a face plate for a vise that is capable of gripping multiple work-pieces of different sizes at the same time. In one embodiment, the disclosed subject matter may be a vise face plate comprising: a base with an upper compensation structure and a lower compensation structure; and, wherein the upper and lower compensation structures define two sets of working surfaces. In use, the plate may be secured to a movable jaw so that the working surfaces may be employed to clamp a plurality of work pieces between the working surfaces and a fixed jaw.

5 Claims, 22 Drawing Sheets

DETAIL A

DETAIL E
SCALE 4 : 1

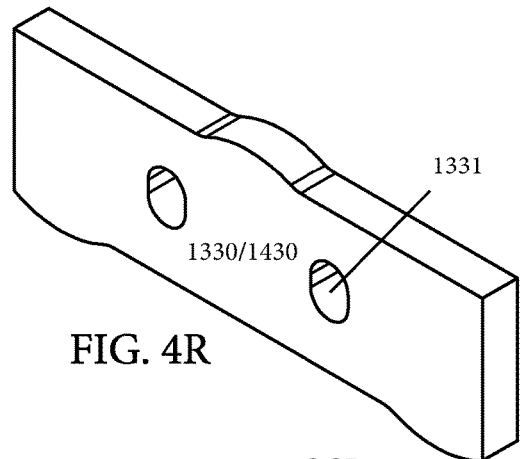
FIG. 4R
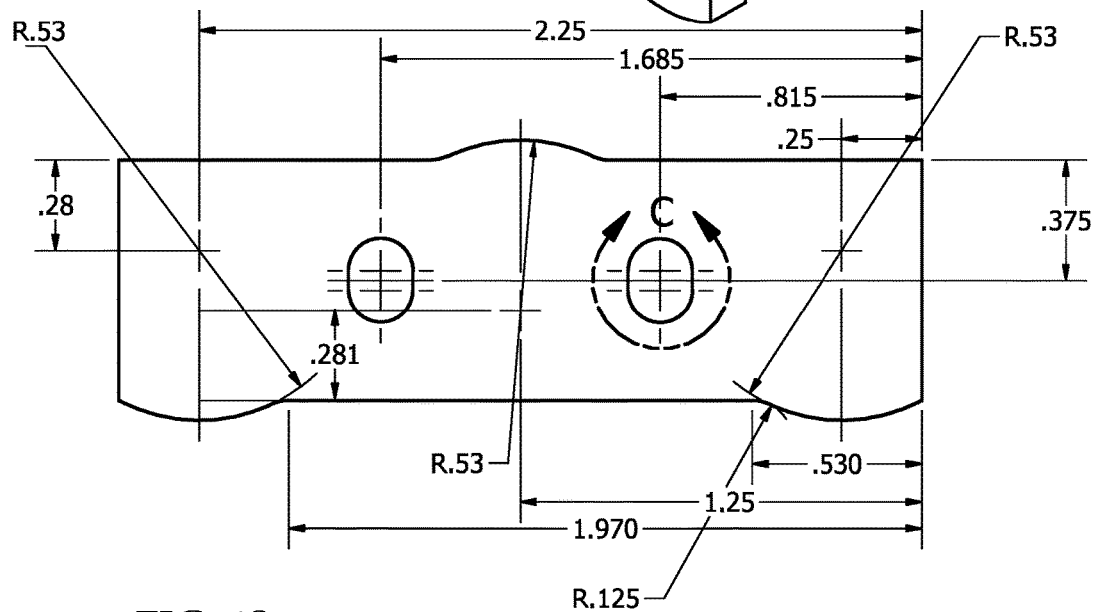
FIG. 4S
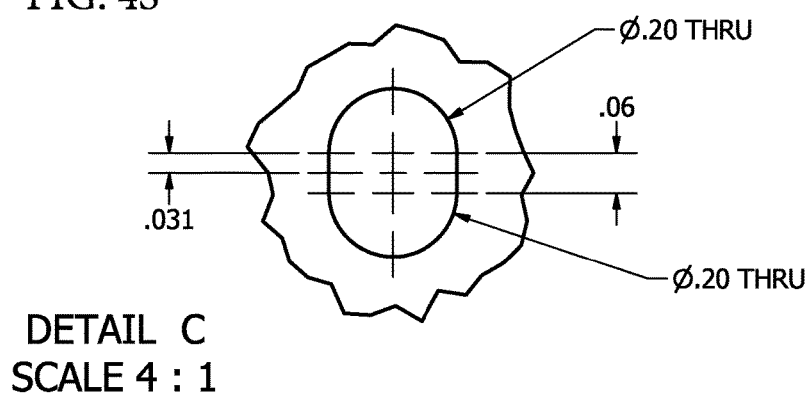
DETAIL C
SCALE 4 : 1

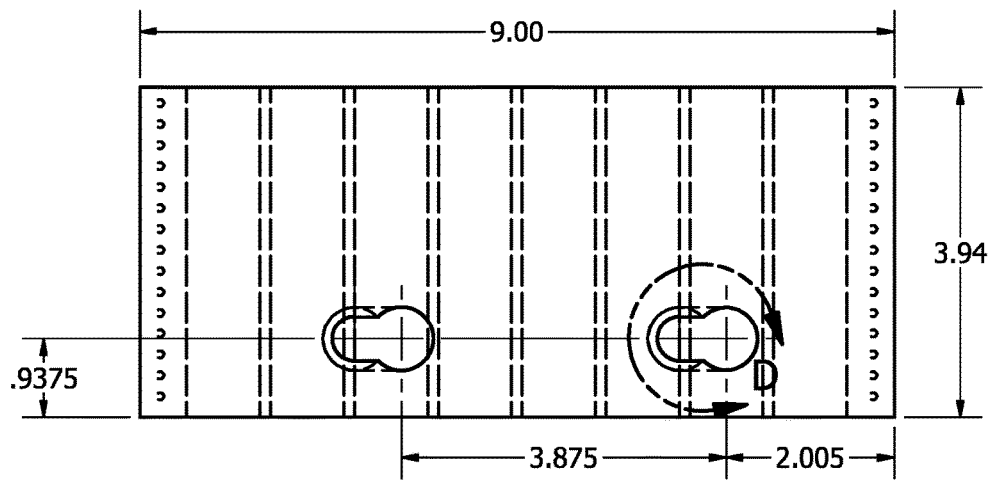
FIG. 4X
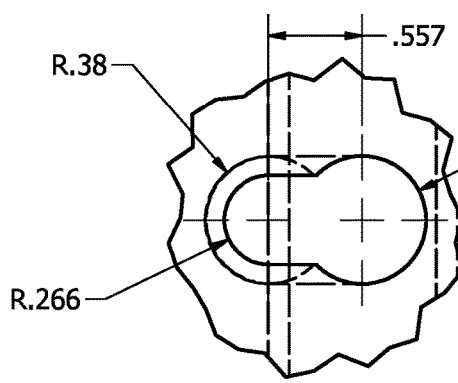
DETAIL D
SCALE 1 : 1

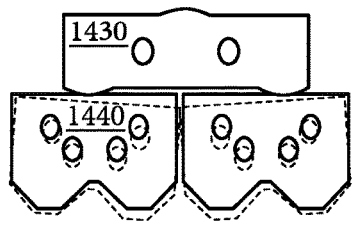
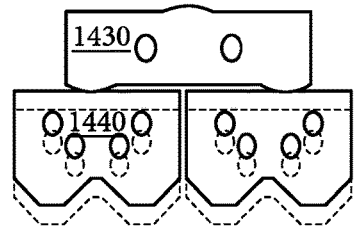
FIG. 7A  FIG. 7B
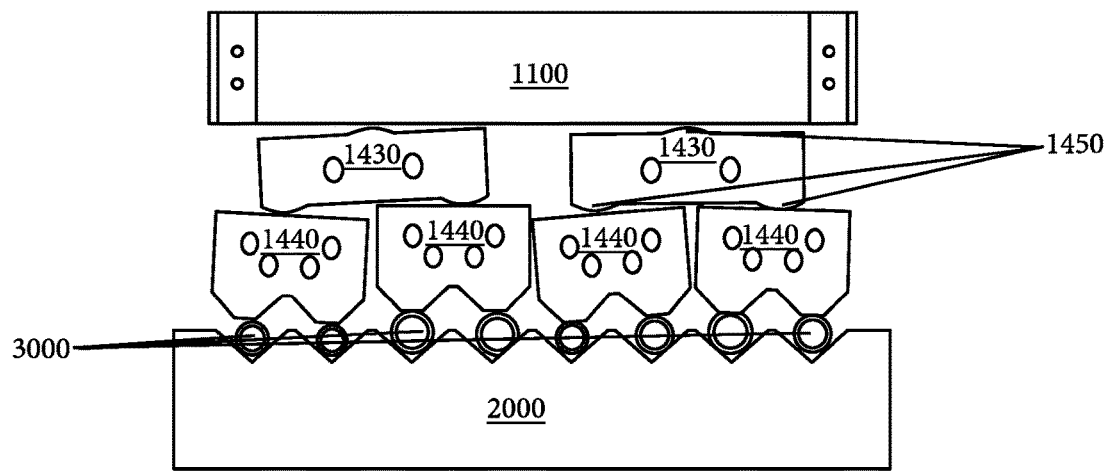
FIG. 7C

COMPENSATING FACE PLATE VISE JAWS AND RELATED METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of Invention

The disclosed subject matter relates generally to a vise for machining work pieces. More particularly, said subject matter is a vise jaw for supporting and securing multiple work pieces for machining.

Background of the Invention

Work pieces are customarily secured against movement between the jaws of a vise during machining. FIG. 1 illustrates a common vise 100 with: a jaw 110 and two face plates 111, 112; and a crank 120 for moving the movable jaw 110 between open and closed positions. In the most basic scenario, a work piece (not shown) is simply clamped or pressed between the two-face plates 111, 112 by turning the crank 120 to drive the movable jaw 110a toward the stationary jaw 110b. Frequently, face plates with differing work-surface qualities or characteristics are required for particular work pieces. For this reason, face plates 111, 112 of common vises 100, are preferably interchangeable (e.g., via removing screws) to enable a user to swap face plates having a variety of working surfaces for customized holding of a particular work piece.

One important limitation of the common vise 100 of FIG. 1 is that only one work piece (e.g., elements 150, 160 or 170 in FIG. 1A) at a time can be reliably secured against movement when pressed between the two face plates 111, 112. Referring to the schematic of face plates 111, 112 shown in FIG. 1A, this limitation is due to each of the face plates 111, 112 having only a single-plane working surface for contacting work pieces, and since once a first work piece 150 is held fast between the planes (as shown) any larger additional work pieces 160 cannot fit between the planes of the face plates 111, 112; and, any smaller additional work pieces 170 fall through the space between the two face plates 111, 112.

In the past, multiple work pieces have been held fast by compensating jaw mechanisms. For instance, U.S. Pat. No. 3,077,346 (issued Feb. 12, 1963) by Lassy discloses a "fixture for holding a plurality of work pieces." Referring to Lassy's figures, Lassy's disclosed device features a compensating jaw assembly 15 which is cooperable with a fixed jaw member 16. Lassy, col. 3:15-20. The jaw assembly 15 is placed on rails 11, 12 and coupled to a crank 58 to drive the jaw assembly 15 along the rails 11, 12 toward or away from the fixed jaw member 16. Id., col. 4:7-30. Ultimately, the working surface of the compensating jaw assembly 15 is defined by a plurality of surfaces (84, 85, 86, 87, 88, 89, 90, and 91) that are each capable of retaining a separate work piece (94, 95, 96, 98, 99, 100, and 101). Id., col. 4: 50-59. Internally, the compensating jaw assembly 15 features stages of pivotable members that allow the surfaces 84, 85, 86, 87, 88, 89, 90, and 91 to yield (i.e., compensate) in response to varying sizes of work pieces (94, 95, 96, 98, 99, 100, and 101).

Although suitable for holding multiple work pieces at once, compensating jaw mechanisms like the one disclosed by Lassy have several inadequacies. First, such compensating jaw mechanisms cannot, with reference to FIG. 1, readily be used on a common vise 100 without removal of the entire moving jaw 110a and replacing the same with a compensating jaw assembly and rails. In other words, known compensating jaw mechanisms cannot be easily retrofitted to common vises. Second, the working surfaces of a compensating jaw assembly cannot quickly be interchanged to meet the holding needs of differing work pieces. In known compensating jaw assemblies, changing the working surfaces is difficult because that action requires either the separate swapping out of each of the underlying compensating elements or swapping out the whole jaw assembly. Thus, a need exits for compensating mechanisms that are easily retrofit to modern vises and that facilitate interchangeability of working surfaces for gripping work pieces.

SUMMARY OF THE INVENTION

In view of the forgoing, it is an objective of this specification to disclose a face plate for a vise that is capable of gripping multiple work-pieces of different sizes at the same time. In one embodiment, the disclosed subject matter may be a vise face plate comprising: a base with an upper compensation structure and a lower compensation structure that project from a face of the base and that are movable in a vertical direction along the front of the base relative to each other; wherein the upper compensation structure is defined by a first carrier plate that suspends a first stage of compensating members; wherein the lower compensation structure is defined by a second carrier plate that suspends a second stage of compensating members; wherein the first stage of compensating members in the upper compensation structure are exposed at one end thereof to define a first set of working surfaces; and wherein the second stage of compensating members in the lower compensation structure are exposed at one end thereof to define a second set of working surfaces. In use, the base may be secured to a movable jaw so that the working surfaces may be employed to clamp a plurality of work pieces between the working surface and a fixed jaw.

BRIEF DESCRIPTION OF THE FIGURES

Other objectives of the disclosure will become apparent to those skilled in the art once the invention has been shown and described. The manner in which these objectives and other desirable characteristics can be obtained is explained in the following description and attached figures in which:

FIG. 4R is a perspective view of a compensating element 1330/1430;

FIG. 4S is a top or bottom view of a compensating element 1330/1430 of FIG. 4R;

FIG. 4X is a back view of the front jaw 2000 of FIG. 4V;

FIG. 4AA is a perspective view of a stop offset 2100;

FIG. 4BB is a left side view of the stop offset 2100 of FIG. 4AA;

FIG. 4CC is a top view of the stop offset 2100 of FIG. 4AA;

FIG. 4DD is a front view of the stop offset 2100 of FIG. 4AA;

FIG. 7A is another diagram of the compensating face plate 1000 of FIG. 5;

FIG. 7B is another diagram of the compensating face plate 1000 of FIG. 5; and FIG. 7C is another diagram of the compensating face plate 1000 of FIG. 5.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed generally is a vise that is capable of gripping multiple work-pieces of different sizes at the same time. In one embodiment, the disclosed subject matter may be a vise face plate comprising: a base with an upper compensation structure and a lower compensation structure that project from a face of the base and that are movable in a vertical direction along the front of the base relative to each other; wherein the upper compensation structure is defined by a first carrier plate that suspends a first stage of compensating members; wherein the lower compensation structure is defined by a second carrier plate that suspends a second stage of compensating members; wherein the first stage of compensating members in the upper compensation structure are exposed at one end thereof to define a first set of working surfaces; and wherein the second stage of compensating members in the lower compensation structure are exposed at one end thereof to define a second set of working surfaces. In use, the base may be secured to a movable jaw so that the working surfaces may be employed to clamp a plurality of work pieces between the working surface and a fixed jaw. The more specific details of the disclosed face plate are described in connection with the figures.

Figure 1:
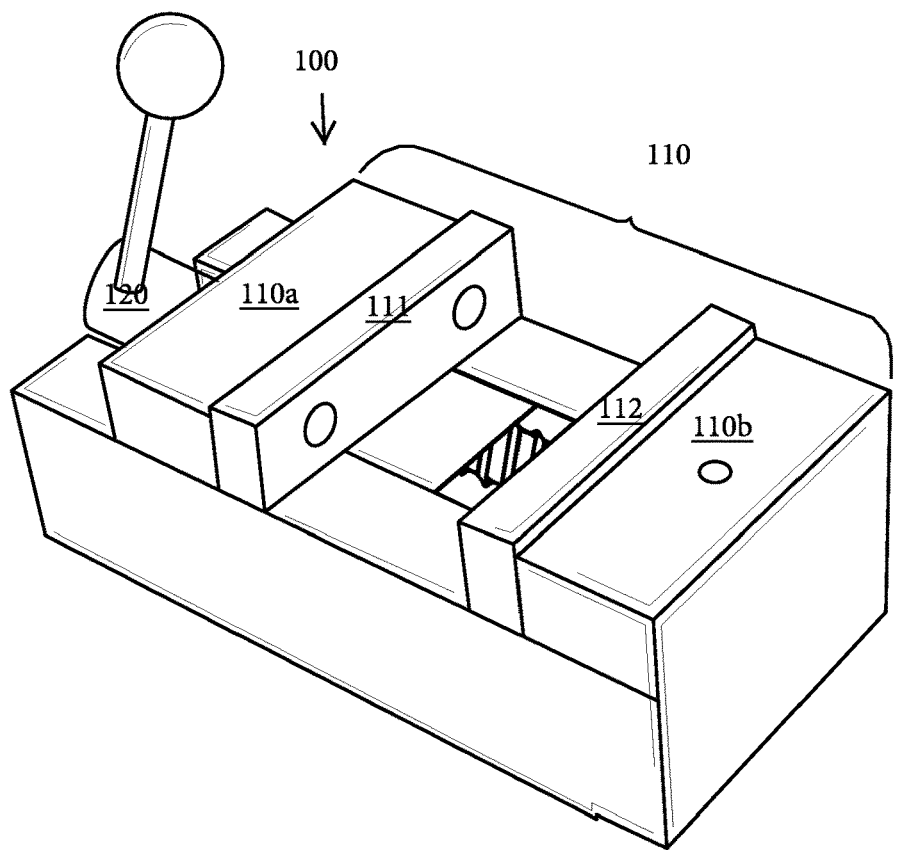
FIG. 1 is a perspective view of a common vise 100 of a prior art vise.
Figure 1A:
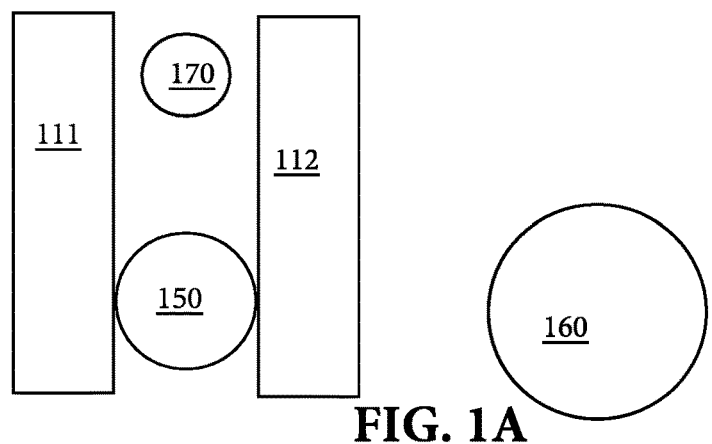
FIG. 1A is a diagram of a prior art vise that illustrates the holding of a work piece 150 between face plates 111, 112.
Figure 2:
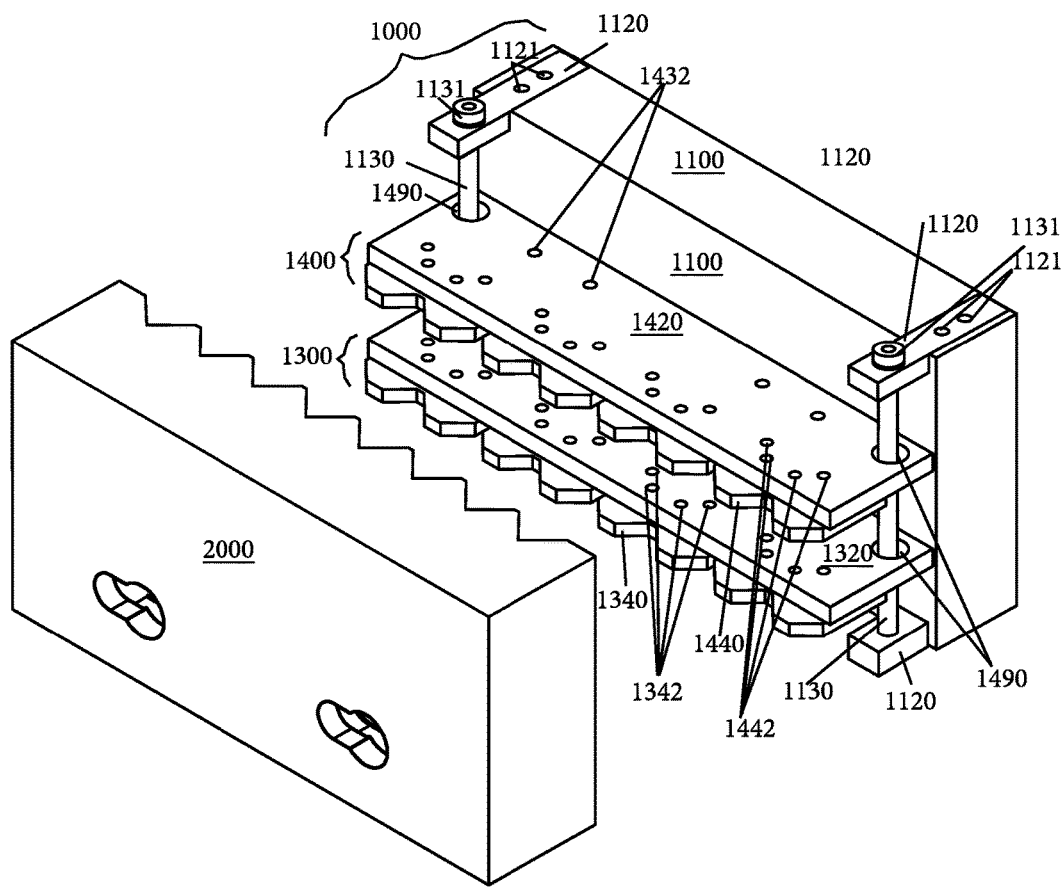
FIG. 2 is a rear perspective of a compensating face plate 1000.
Figure 3:
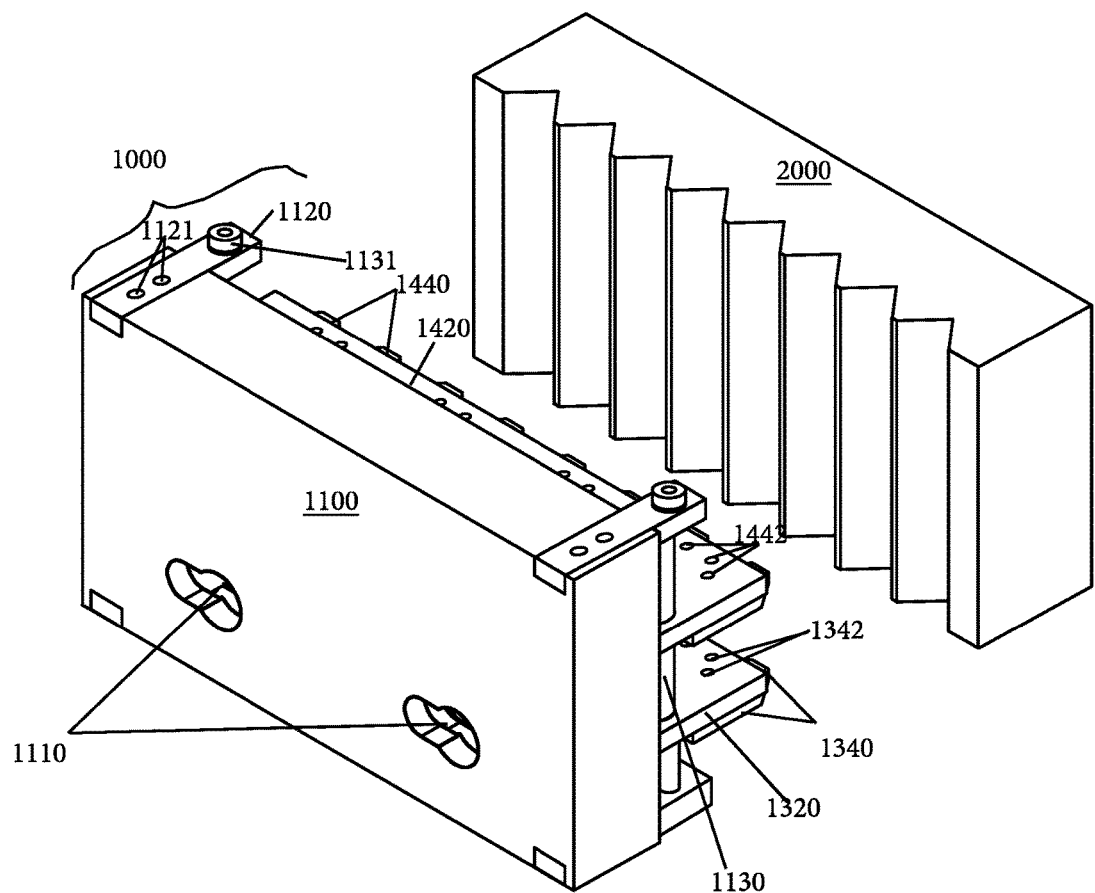
FIG. 3 is a front perspective of the compensating face plate 1000 of FIG. 2.
Figure 4:
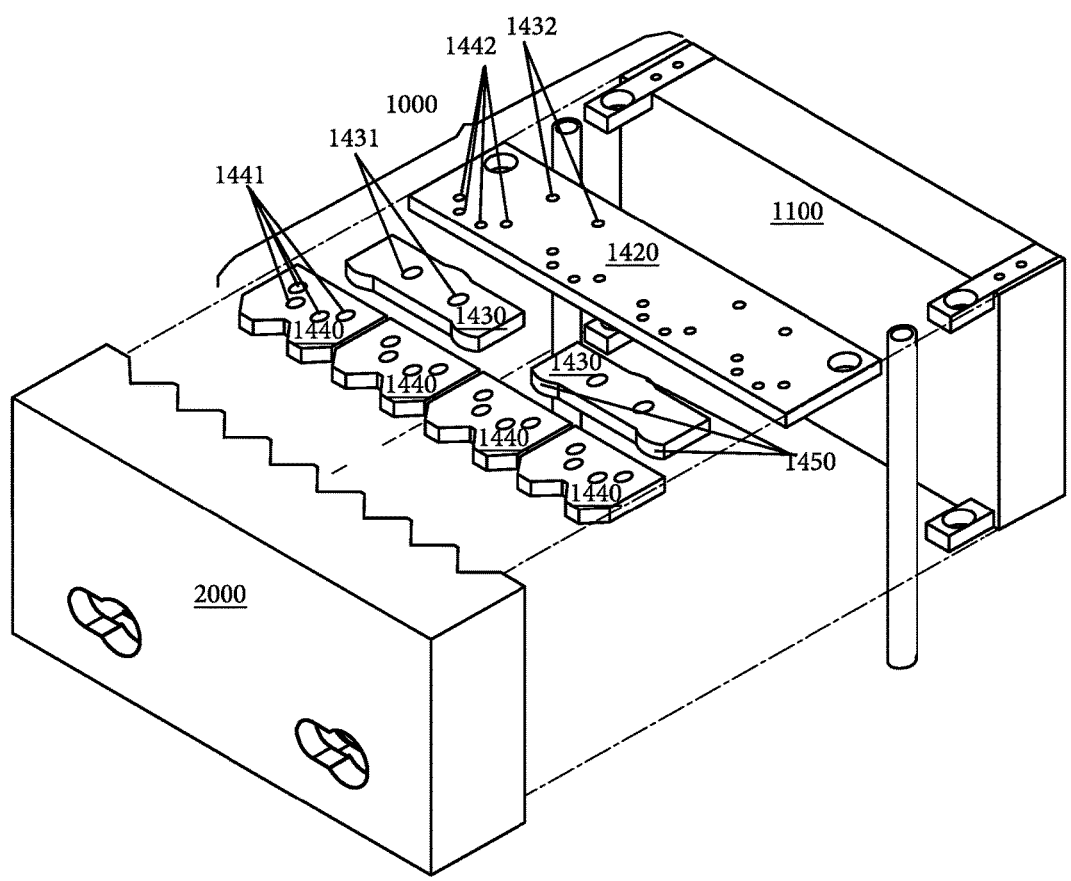
FIG. 4 an exploded perspective of the compensating face plate 1000 of FIGS. 2 and 3.

FIG. 2 is a front perspective of a compensating face plate 1000. FIG. 3 is a rear perspective of the compensating face plate 1000 of FIG. 2. FIG. 4 an exploded perspective of the compensating face plate 1000 of FIGS. 2 and 3. In these figures, the compensating face plate 1000 is shown being opposed to a standard face plate 2000, as would be the case when the face plates 1000, 2000 are installed on a common vise of the type shown in FIG. 1). As shown in FIGS. 2 through 4 the compensating face plate 1000 generally comprises a base 1100, an upper compensating structure 1400 and a lower compensating structure 1300.

Referring to FIGS. 2 and 3, preferably, the base 1100 is a standard block with two apertures 1110 for securing the base 1100 to a jaw of a standard vise (not shown). In one embodiment, the apertures 1110 allow for a user to interchange the compensating face plate 1000 on a standard vise and enable the bolting of the device 1000 to the jaw of a standard vise (not shown). A preferred embodiment of the apertures are discussed in connection with FIGS. 4A through 4F below. Other securing means known to those of skill in the art may be used for securing the base 1100 to a jaw of a vise (not shown).

As shown in FIGS. 2 and 3, the upper compensating structure 1400 and lower compensating structure 1300 project from the upper and lower portions of the face of the base 1100. Suitably, the base 1100 may be a rectangular block where the upper and lower compensating structures 1300/1400 preferably sit on two dowels 1130 that are secured to the front of the base 1100 along the sides via joints 1120 that extend forward from the base's 1100 four corners. Suitably, the compensating structures 1300/1400 are movable relative to one another along the dowels 1130 in a vertical direction and over the front of the base 1100. Preferably, the compensating structures may be releasably set or locked in a position along the dowels 1130 by virtue of the dowels 1130 residing in slip-fit bores 1490 in the compensating structures 1300/1400. Suitably, the slip-fit of the bore 1490 may be accomplished via providing a rubber ring or o-ring around the bore 1490. The dowels 1130 may suitably be held fast relative to the base 1100 via bolts 1131 (e.g., stripper bolts) over and through the joints 1120. In a preferred embodiment, the benefit of having an upper and lower compensating structure 1400, 1300 with a gap between the two for access to the aperture 1110 is that it allows for (i) a user to interchange the compensating face plate 1000 from the jaw of one standard vise to another and (ii) a user to adjust the working surface of the face plate 1000 to shorter or taller work pieces (i.e. adjustments in the vertical dimension). Referring to FIG. 2, the joints 1120 on the top of the base 1100 are secured to the base 1100 by rivets 1121 fastened through the joints 1120 into the base 1100. Also displayed in FIG. 2 are compensating plates 1440, which are loosely suspended from the carrier plate 1420 of the upper compensating structure 1400 via rivets 1442. Additionally shown are compensating plates 1340, which are loosely suspended from the carrier plate 1320 of the lower compensating structure 1300 via rivets 1342.

Referring to FIG. 4, the upper compensating structure 1400 is defined by a carrier plate 1420 that loosely suspends a first stage of compensating elements 1430 and a second stage of compensating elements or plates 1440. Preferably, the first stage comprises two compensating elements 1430 and the second stage comprises four compensating elements or plates 1440. Referring to FIG. 2, each of the compensating elements 1430 (not shown in FIG. 2) are loosely and movably suspended from the carrier plate 1420 via a rivet or pin 1432. Similarly, each of the compensating elements 1440 are loosely and movably suspended from the carrier plate 1420 via a rivets or pins 1442. Referring to FIG. 4, the loose and movable mounting of the compensating members 1430, 1440 may suitably be provided with openings 1431, 1441 for receiving the corresponding rivets or pins 1432, 1442. Still referring to FIG. 4, the rear and the front of the compensating members 1430 feature nubs 1450 that are medially positioned in the back and side positioned on the front so that interaction therewith will cause the compensating members 1440, 1430 to pivot around the nubs 1450. This interaction is described in better detail in connection with FIGS. 7A through 7B. In one embodiment, the nubs 1450 may be arcuated, semi-circle, triangular, or any other shape that accomplishes a pivot point.

Although not shown in FIG. 4, FIGS. 2 and 3 show that the lower compensating structure 1300 is also defined by a carrier plate 1320 that loosely and movably suspends a first stage of compensating elements 1330 (not shown) and a second stage of compensating elements 1340. Referring to FIG. 3, each of the compensating elements 1330 (not shown) are loosely and movably suspended from the carrier plate 1320 via rivets or pins 1332 (not shown). Similarly, each of the compensating elements 1340 are loosely and movably suspended from the carrier plate 1420 via rivets or pins 1342. The structures and operations of the lower compensating structure 1300 and 1400 are the same and differ only by reference numerals in the drawings.

Figure 4A:
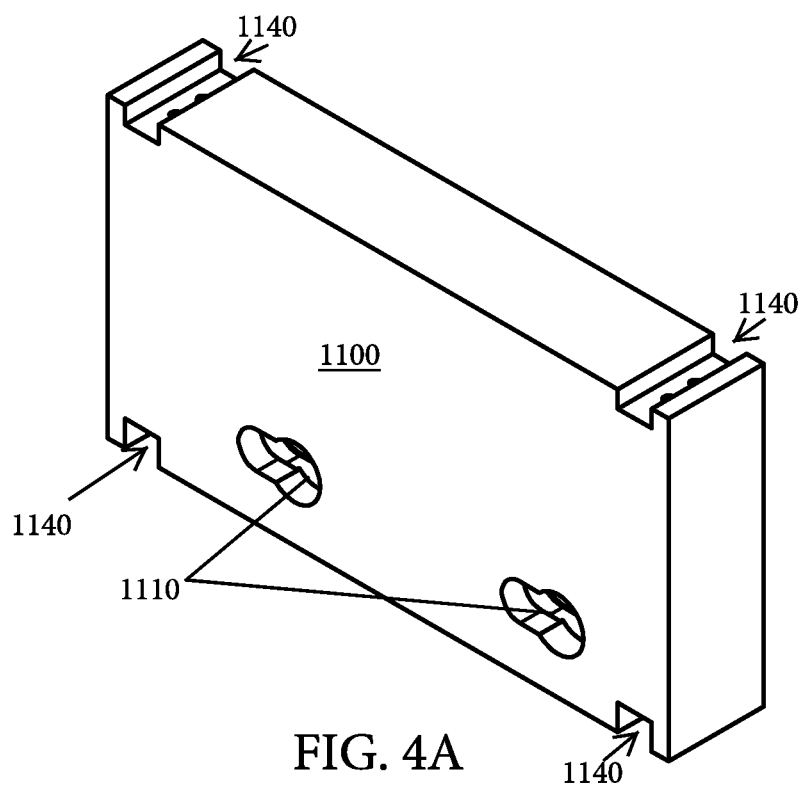
FIG. 4A is a rear perspective view of an base 1100.
Figure 4B:
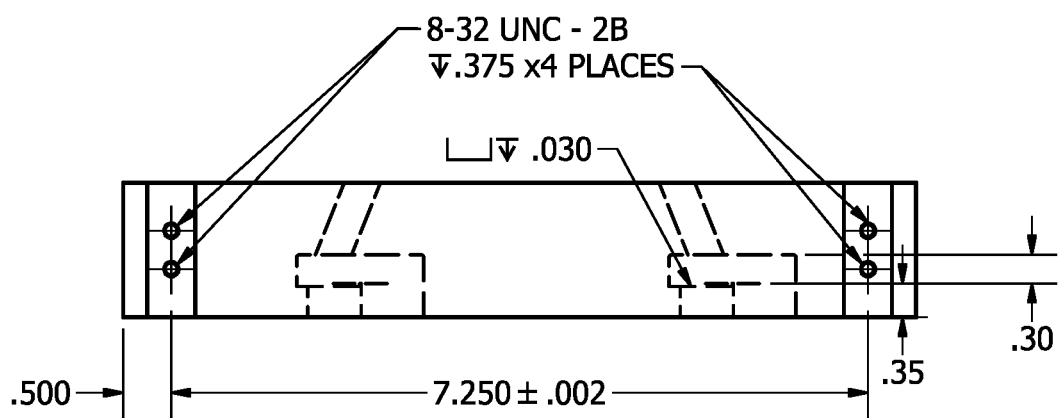
FIG. 4B is a top view of the base 1100 of FIG. 4A.
Figure 4C:
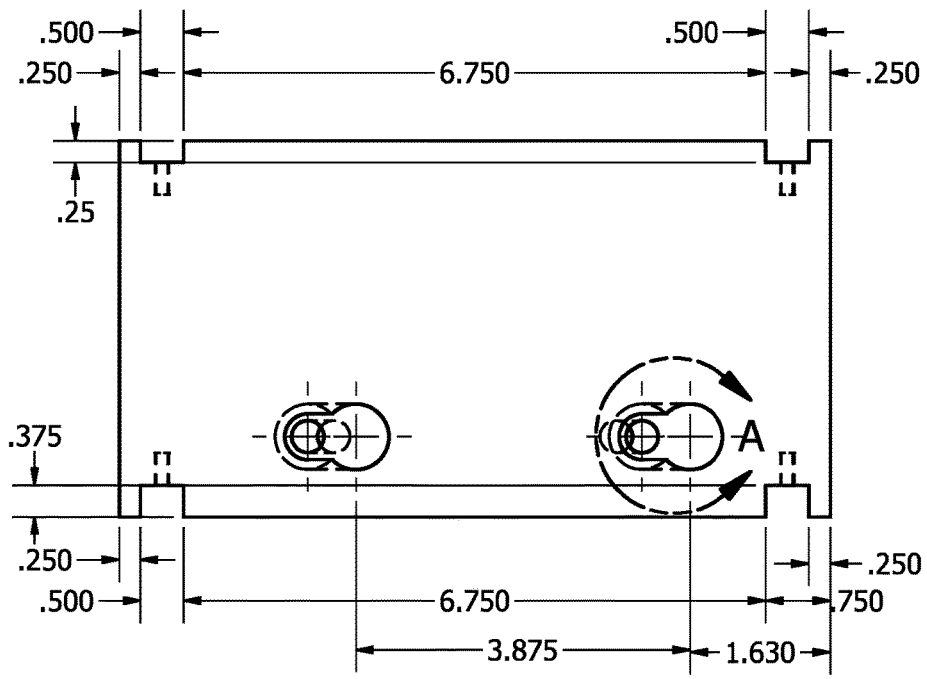
FIG. 4C is a rear view of the base 1100 of FIG. 4A.
Figure 4D:
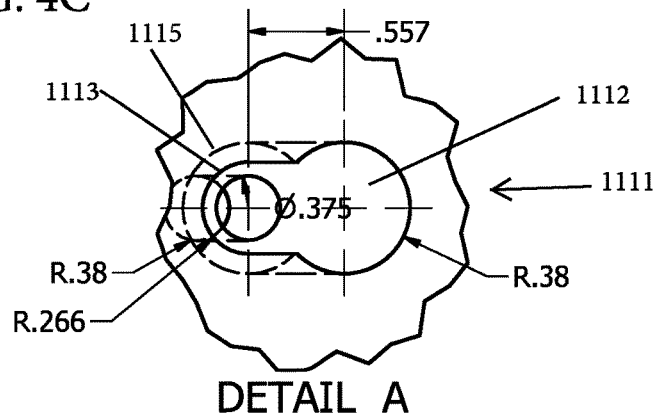
FIG. 4D is a bottom view of the base 1100 of FIG. 4A.
Figure 4D:
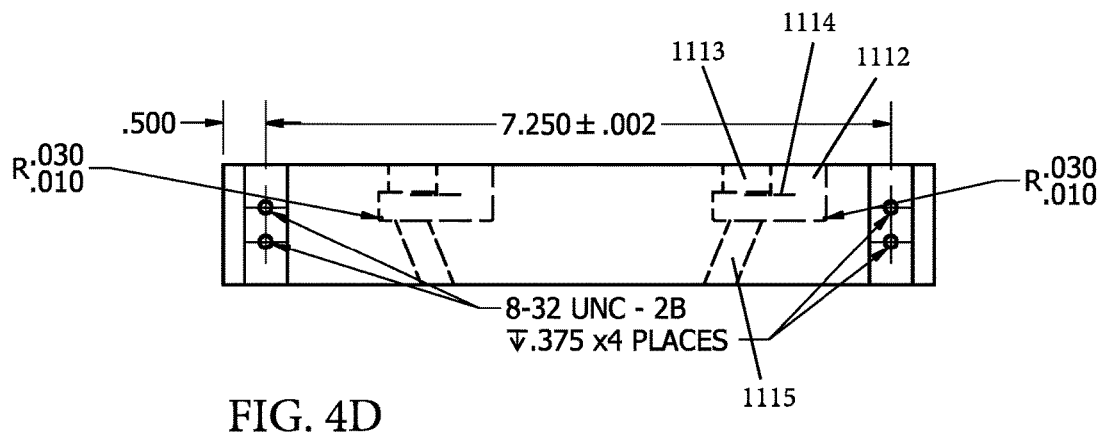
Figure 4E:
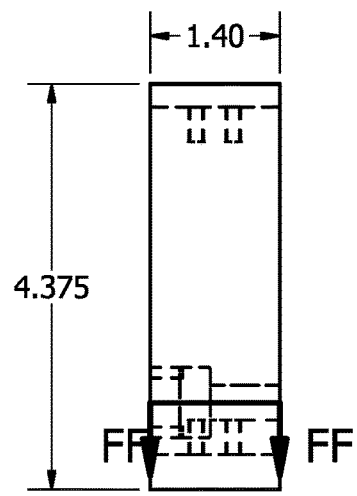
FIG. 4E is a side view of the base 1100 of FIG. 4A.
Figure 4F:
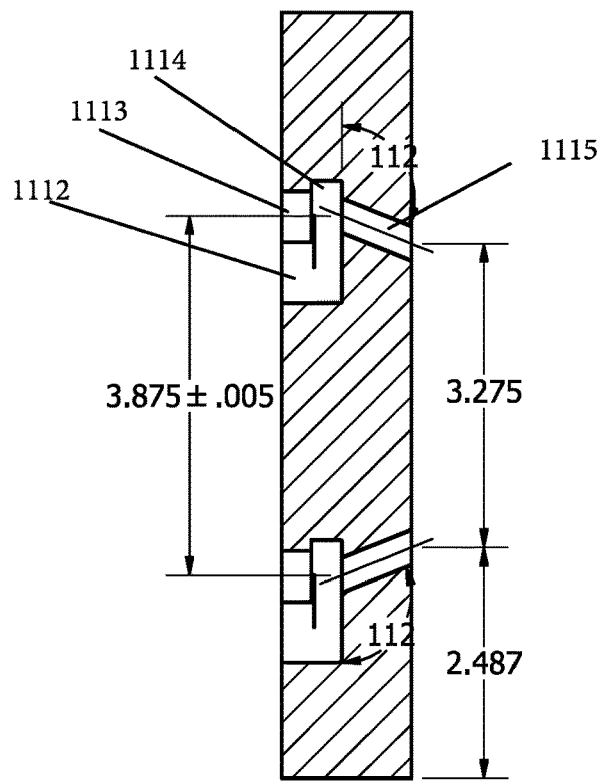
FIG. 4F is a cross section view of the base 1100 of FIG. 4A through line F-F in FIG. 4E.

FIG. 4A is a rear perspective view of the base 1100. FIG. 4B is a top view of the base 1100 of FIG. 4A. FIG. 4C is a rear view of the base 1100 of FIG. 4A. FIG. 4D is a bottom view of the base 1100 of FIG. 4A. FIG. 4E is a side view of the base 1100 of FIG. 4A. Finally, FIG. 4F is a cross section view of the base 1100 of FIG. 4A through line F-F in FIG. 4E. As shown, the base 1100 is preferably a standard block with two apertures 1110 for securing the base 1100 to a jaw of a standard vise (not shown). The base also features four cutouts 1140 on the top and bottom corners for receiving the joints 1120 as discussed above. Suitably, a preferred embodiment of the base 1100 is a four and a half inch by one and a half inch by eight and a half inch "1018 cold rolled" block that is otherwise dimensioned as shown in the drawings, where numbers in the form of: X.X have a tolerance of plus or minus 0.050; X.XX have a tolerance of plus or minus 0.030; and X.XXX have a tolerance of plus or minus 0.010.

Still referring to FIGS. 4A through F, in one embodiment, the apertures 1110 allow for a user to interchange the compensating face plate 1000 on a standard vise and enable the bolting of the device 1000 to the jaw of a standard vise (not shown). A preferred embodiment of the apertures 1110 are discussed in connection with FIGS. 4B through 4F below. Other securing means known to those of skill in the art may be used for securing the base 1100 to a jaw of a vise (not shown). Referring to FIGS. 4B, 4C (DETAIL A), 4D, 4E (LINE F-F) and 4F, the apertures 1110 define a modified "keyhole" connection. Keyhole connections are well known in the art as an expedient for rapidly joining a pair of members. See, e.g., U.S. Pat. No. 2,810,600 by Kendrick (circa 1954) and U.S. Pat. No. 6,022,010 by Bernstein (issued Feb. 8, 2000). Ordinary keyhole connections incorporate one or more slots in a first member which is adapted to be secured to a second member by screws or bolts. In these old keyholes, the slots are each formed with an enlarged portion which will pass the bolt head and a portion which is reduced in width to pass the bolt shank but not the head. Applying the general principles of a keyhole connection, the preferred embodiment of the base 1100 shown in the figures features the apertures 1110 that are defined by slot 1111 (see FIG. 4C, detail A) with an enlarged portion 1112 (see FIG. 4C, detail A) that will pass the head of a bolt (not shown) and a portion 1113 (see FIG. 4C, detail A) which is reduced in width to receive the shank so that a bolt head fit into the keyhole may be tightened down over a collar 1114 (FIGS. 4E (LINE F-F) and 4F) via inserting a tool through the passage 1115 (FIGS. 4E (LINE F-F) and 4F). The slots 1111 may suitably completely enclosed and within the periphery of the base 1100 with the enlarged portion 1112 spaced apart the same distance corresponding connection points on a vice jaw (not shown). To install the base 1100 on a vise jaw (not shown), bolts (not shown) with a head and shank are provided to the jaw (not shown) and are loosened so that the heads are protruding sufficiently far from the jaw surface (not shown) so that the heads (not shown) can be provided into the large portion 1112 of the slots 1111 of the base 1100. Then the base 1100 may be slid so that the shanks of the bolts are provided through the reduced portions 1113 of the slots 1111 with the heads of the bolts (not shown) internally positioned within the slots 1111 and abutting the collar 1114. Finally, the bolts (not shown) may be tightened down against the collar 1114 via a tool (e.g., an Allen wrench) provided diagonally through the passage 1115. In the preferred embodiment, the passage is diagonal so that a tool provide thereto may be easily operated without conflicting mechanically with the dowels 1130 when the face plate is fully assembled.

Figure 4G:
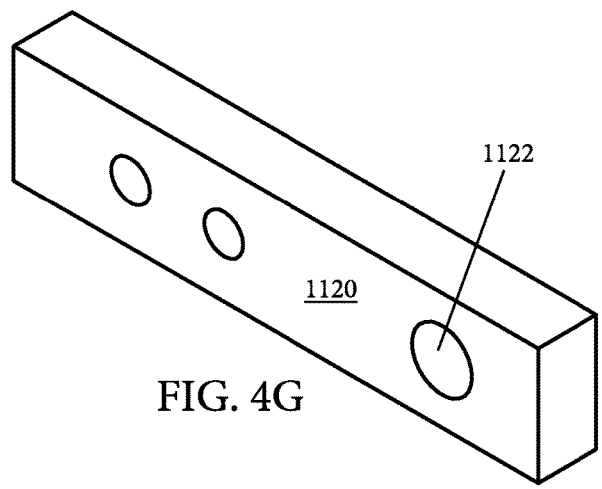
FIG. 4G is a perspective view of a joint 1120.
Figure 4H:
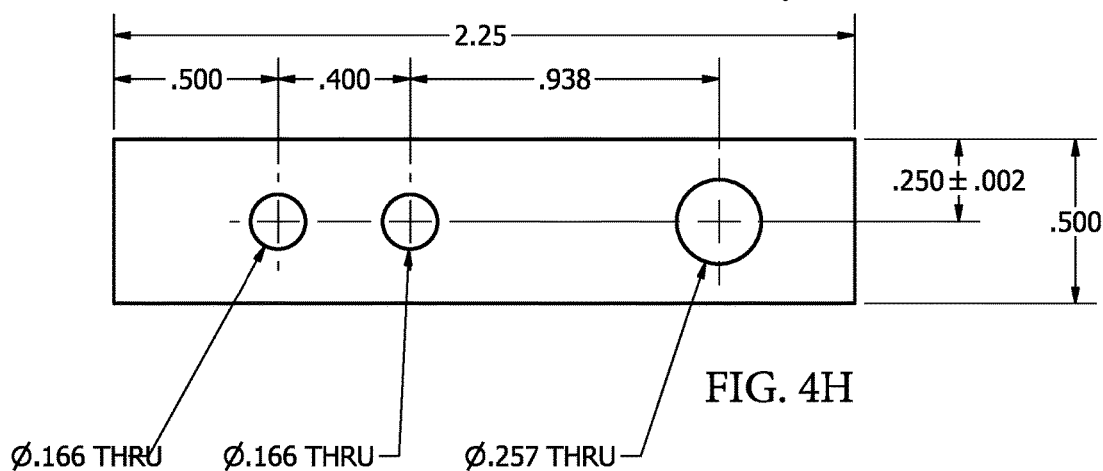
FIG. 4H is a top or bottom view of the joint 1120 of FIG. 4G.
Figure 4I:
FIG. 4I is an either side view of the joint 1120 of FIG. 4G.
Figure 4J:
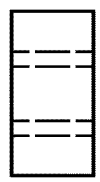
FIG. 4J is a front or back view of the joint 1120 of FIG. 4G.

FIG. 4G is a perspective view of a joint 1120. FIG. 4H is a top or bottom view of the joint 1120 of FIG. 4G. FIG. 4I is an either side view of the joint 1120 of FIG. 4G. FIG. 4J is a front or back view of the joint 1120 of FIG. 4G. The joint 1120 is configured to fit within the cutouts 1140 on the top and bottom corners of the base 1100 (see FIGS. 2 and 3) as discussed above. The joint 1120 suitably features two apertures for receiving rivets 1121 (see FIGS. 2 and 3) and an aperture 1122 for receiving the dowel 1130 (see FIG. 4) as discussed above. Suitably, a preferred embodiment of the joint 1120 is a half inch by quarter inch by two and a quarter inch "1018 cold rolled" plate that is otherwise dimensioned as shown in the drawings, where numbers in the form of: X.X have a tolerance of plus or minus 0.050; X.XX have a tolerance of plus or minus 0.030; and X.XXX have a tolerance of plus or minus 0.010.

Figure 4K:
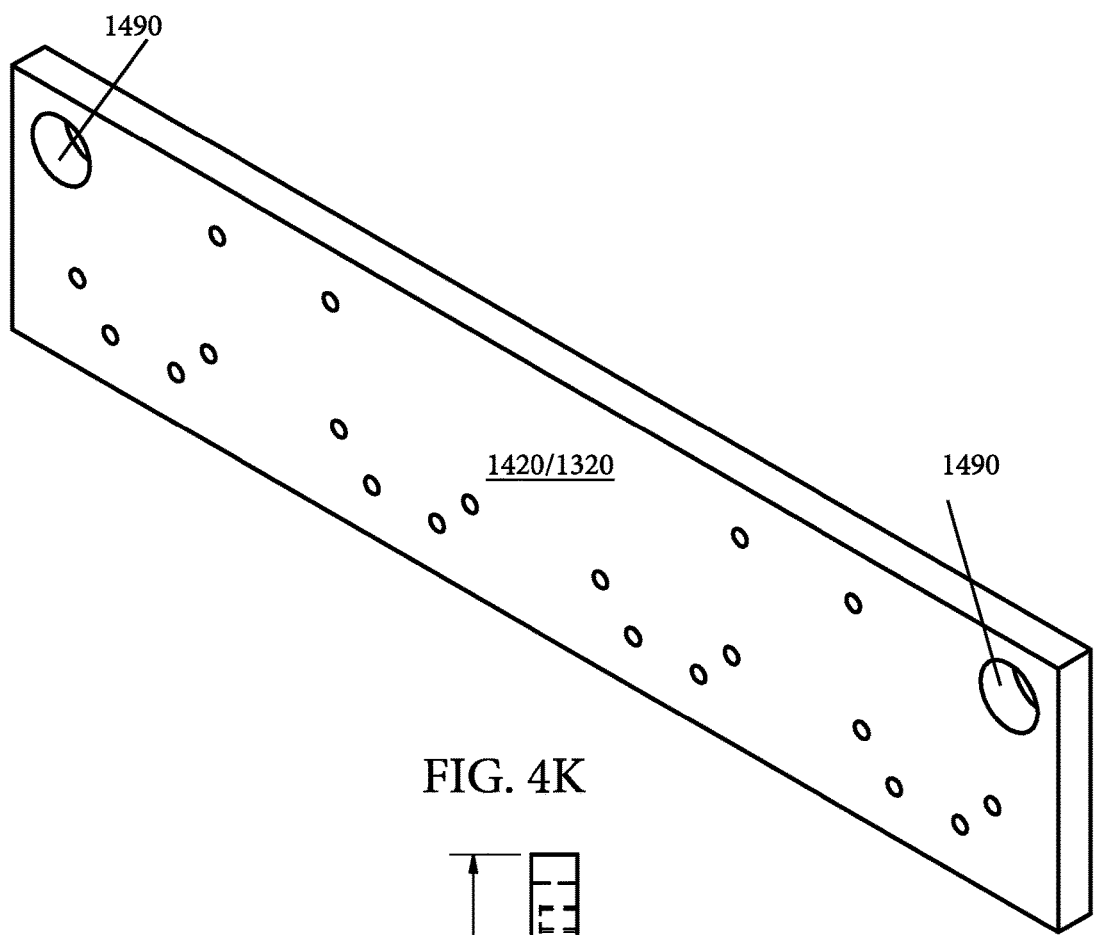
FIG. 4K is a perspective view of a carrier plate 1410/1310.
Figure 4L:
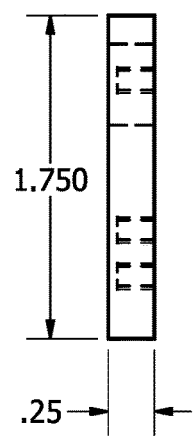
FIG. 4L is an either side view of the carrier plate 1410/1310 of FIG. 4K.
Figure 4M:
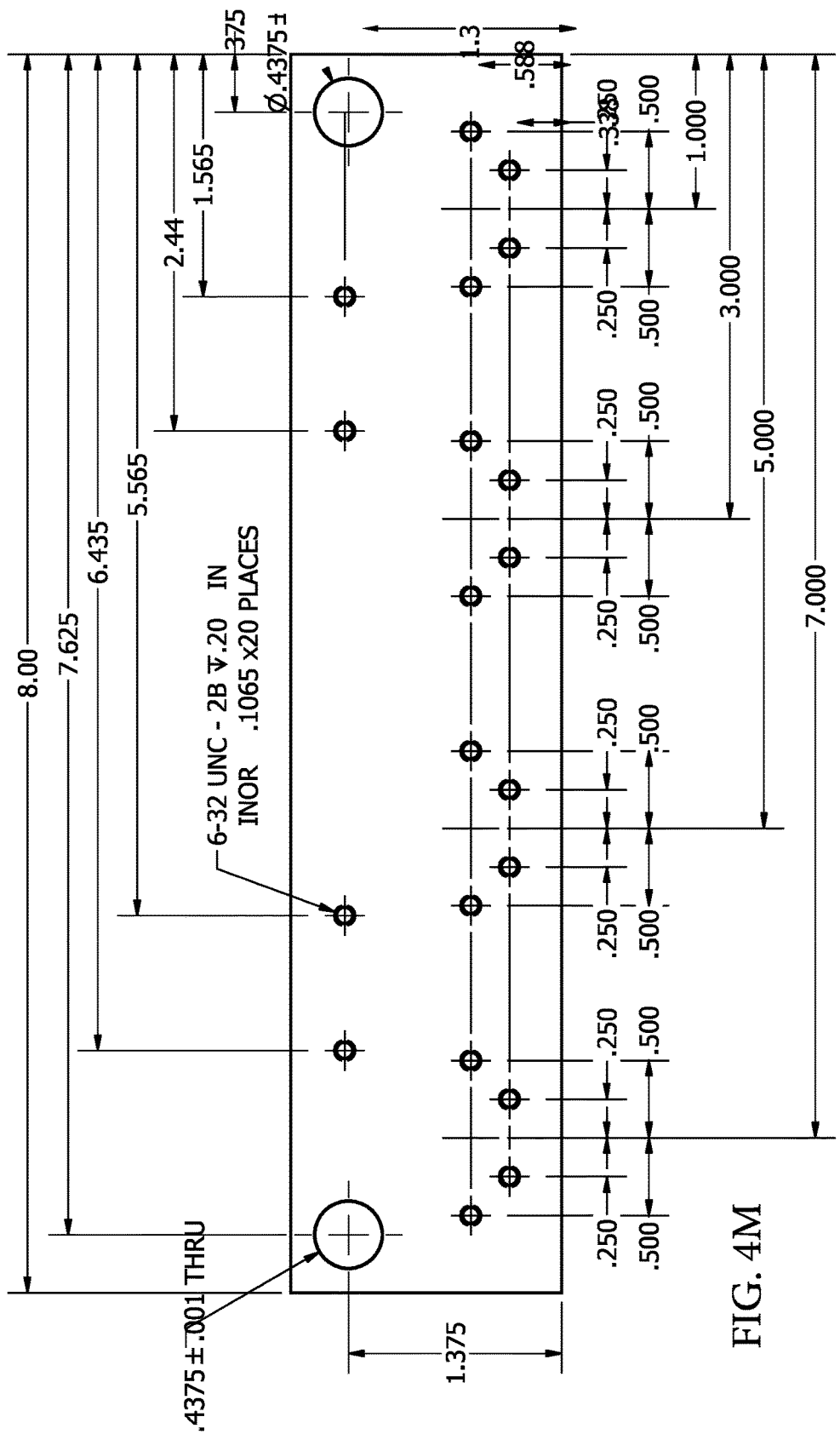
FIG. 4M is a top or bottom view of the carrier plate 1410/1310 of FIG. 4M.

FIG. 4K is a perspective view of a carrier plate 1420/1320. FIG. 4L is an either side view of the carrier plate 1420/1320 of FIG. 4K. FIG. 4M is a top or bottom view of the carrier plate 1420/1320 of FIG. 4M. The carrier plate 1420/1320 features bores 1490 for slip fit retention of a dowel 1130 (not shown) and bores for loosely and adjustably securing compensating elements 1430/1330 (see FIGS. 2. and 3) and compensating plates 1440/1340 (see FIGS. 2 and 3) via rivets or pins 1432/1442/1332/1342 (see FIGS. 2 and 3). Suitably, a preferred embodiment of the joint carrier plate 1420/1320 is a half inch by quarter inch by two and a quarter inch "1018 cold rolled" plate that is otherwise dimensioned as shown in the drawings, where numbers in the form of: X.X have a tolerance of plus or minus 0.050; X.XX have a tolerance of plus or minus 0.030; and X.XXX have a tolerance of plus or minus 0.010.

Figure 4N:
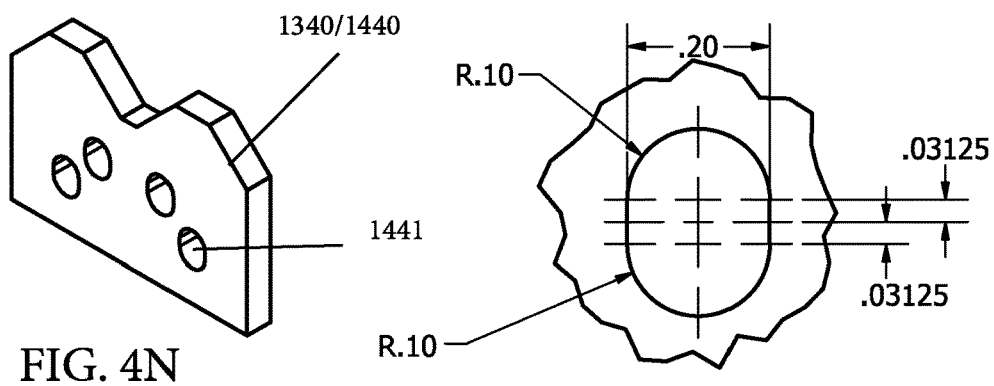
FIG. 4N is a perspective view of a compensating plate 1340/1440.
Figure 4O:
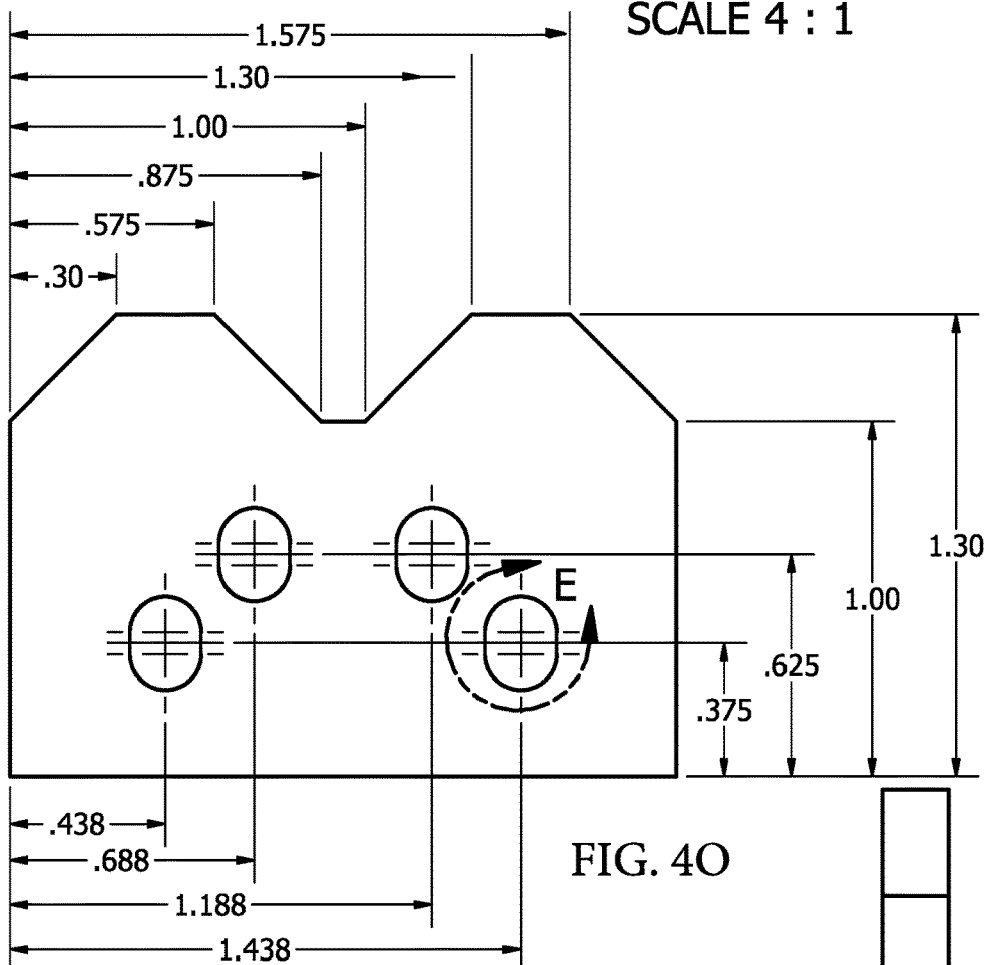
FIG. 4O is a top or bottom view of a compensating plate 1340/1440 of FIG. 4N.
Figure 4P:
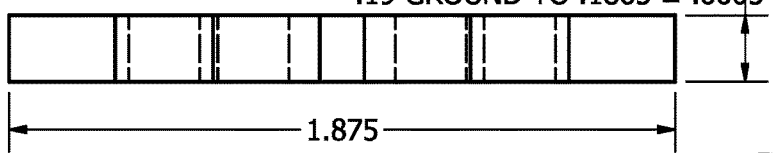
FIG. 4P is a front view of a compensating plate 1340/1440 of FIG. 4N.
Figure 4Q:
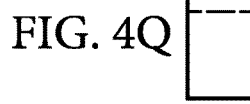
FIG. 4Q is an either side view of a compensating plate 1340/1440 of FIG. 4N.

FIG. 4N is a perspective view of a compensating plate 1340/1440. FIG. 4O is a top or bottom view of a compensating plate 1340/1440 of FIG. 4N. FIG. 4P is a front view of a compensating plate 1340/1440 of FIG. 4N. FIG. 4Q is an either side view of a compensating plate 1340/1440 of FIG. 4N. As shown, the plate 1340/1440 features bores 1441 so that the same may be movably suspended on a carrier plate 1320/1420 (not shown). Suitably, a preferred embodiment of the compensating plate 1340/1440 is a 0-1 tool steel plate that is otherwise dimensioned as shown in the drawings, where numbers in the form of: X.X have a tolerance of plus or minus 0.050; X.XX have a tolerance of plus or minus 0.030; and X.XXX have a tolerance of plus or minus 0.010.

Figure 4T:
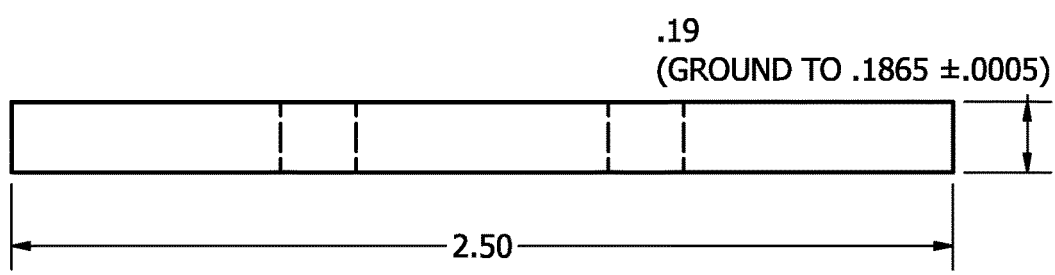
FIG. 4T is a front or back view of a compensating element 1330/1430 of FIG. 4R.
Figure 4U:
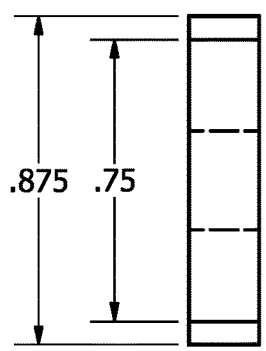
FIG. 4U is an either side view of a compensating element 1330/1430 of FIG. 4R.

FIG. 4R is a perspective view of a compensating element 1330/1430. FIG. 4S is a top or bottom view of a compensating element 1330/1430 of FIG. 4R. FIG. 4T is a front or back view of a compensating element 1330/1430 of FIG. 4R. FIG. 4U is an either side view of a compensating element 1330/1430 of FIG. 4R. As shown, the elements 1330/1430 features bores 1331 so that the same may be movably suspended on a carrier plate 1320/1420 (not shown). Suitably, a preferred embodiment of the compensating element 1330/1430 is a 0-1 tool steel plate that is otherwise dimensioned as shown in the drawings, where numbers in the form of: X.X have a tolerance of plus or minus 0.050; X.XX have a tolerance of plus or minus 0.030; and X.XXX have a tolerance of plus or minus 0.010.

Figure 4V:
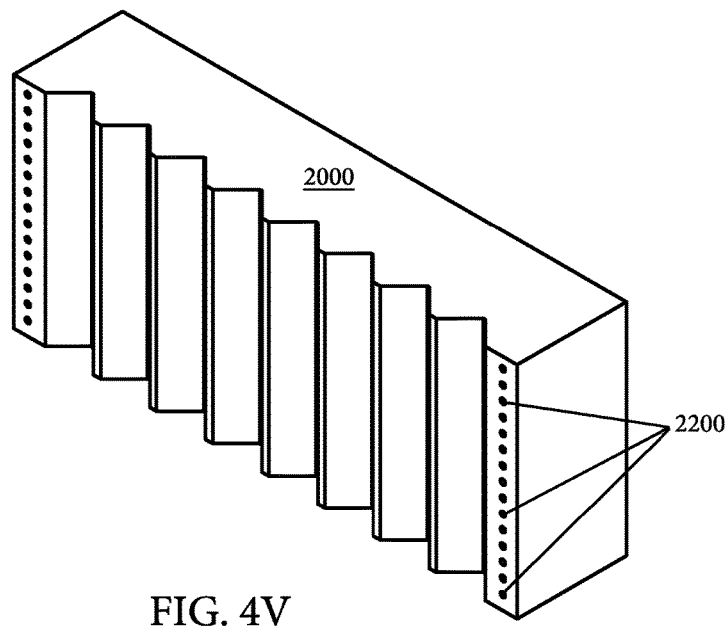
FIG. 4V is a perspective view of a front jaw 2000.
Figure 4W:
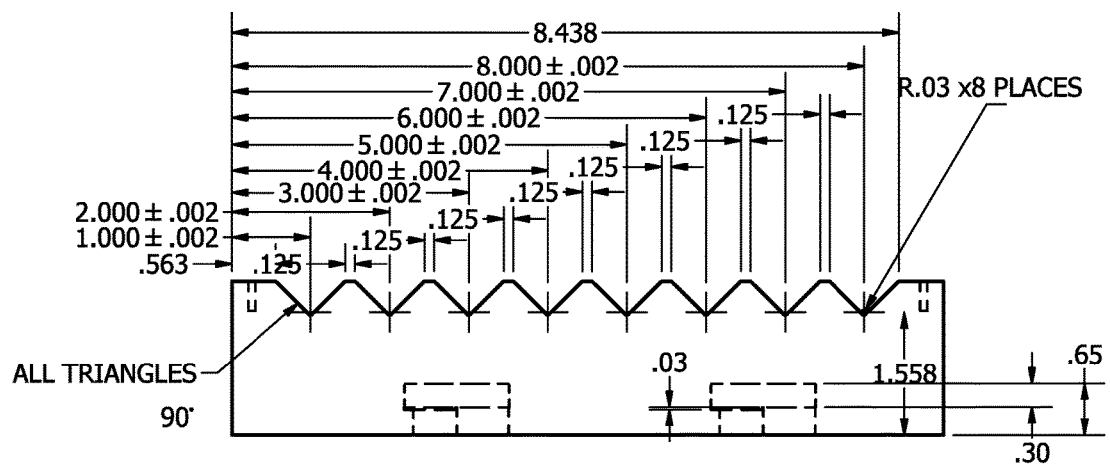
FIG. 4W a top or bottom view of the front jaw 2000 of FIG. 4V.
Figure 4Y:
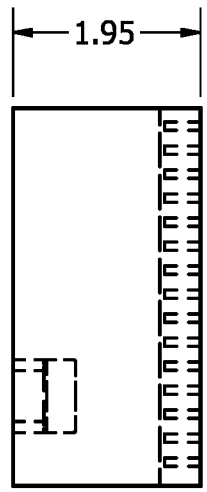
FIG. 4Y is a side view of the front jaw 2000 of FIG. 4V.
Figure 4Z:
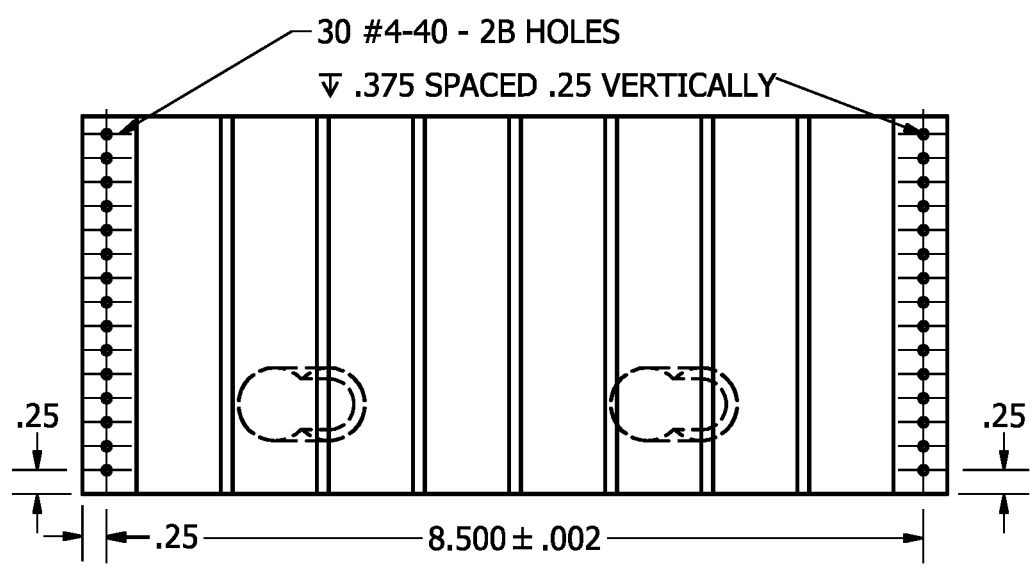
FIG. 4Z is a front view of the front jaw 2000 of FIG. 4V.
Figures 4A, 4B:
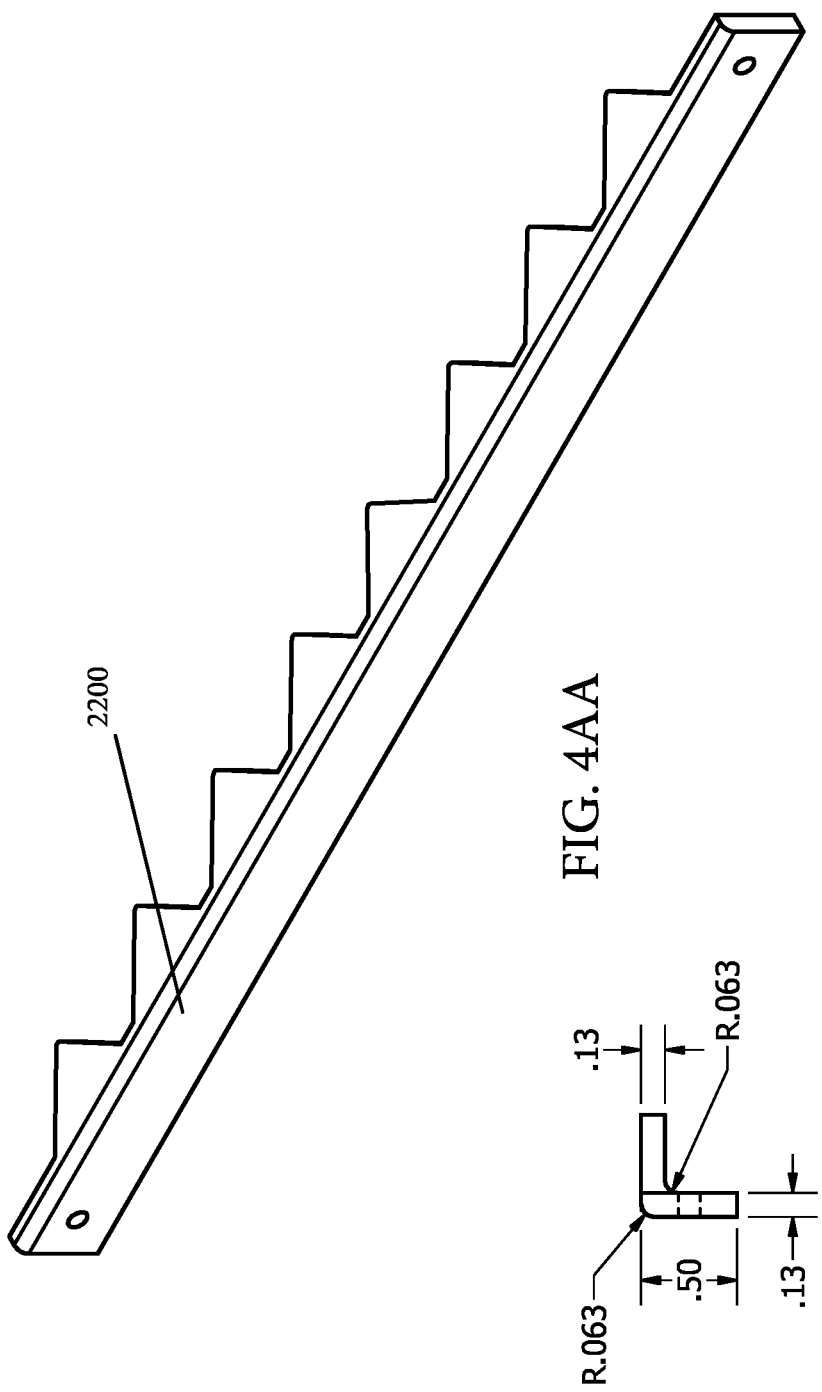
Figure 4C:
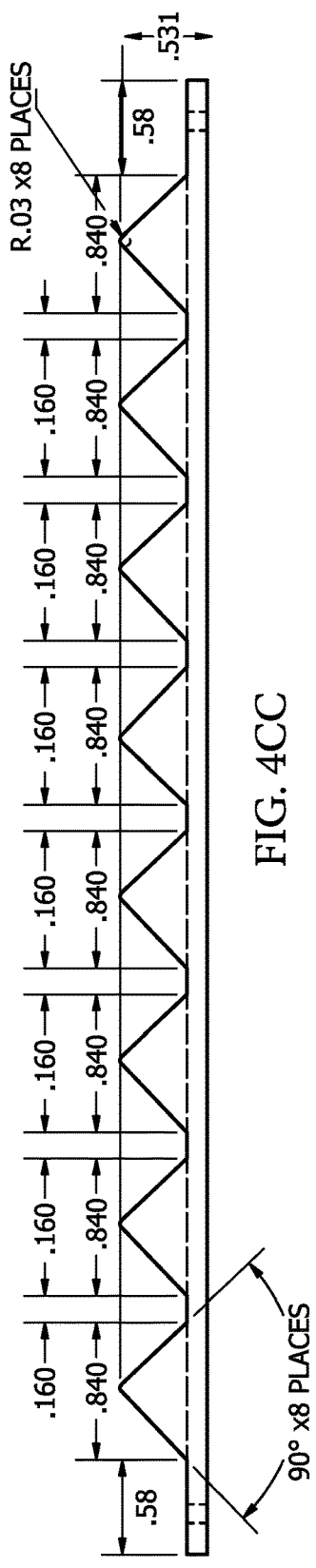
Figure 4D:
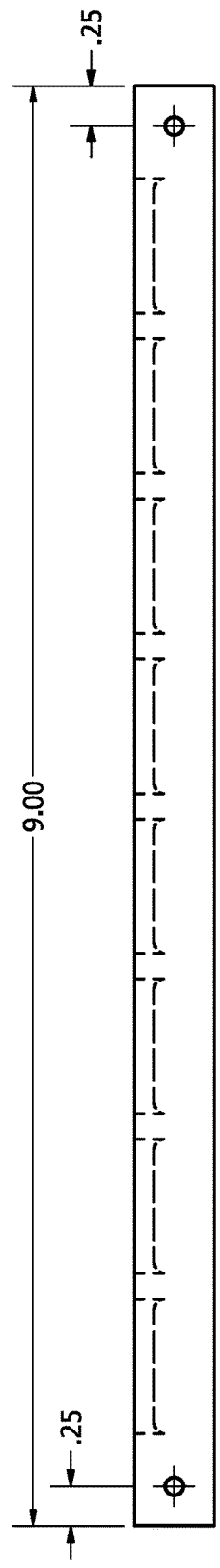

FIG. 4V is a perspective view of a front jaw 2000. FIG. 4W a top or bottom view of the front jaw 2000 of FIG. 4V. FIG. 4X is a back view of the front jaw 2000 of FIG. 4V. FIG. 4Y is a side view of the front jaw 2000 of FIG. 4V. FIG. 4Z is a front view of the front jaw 2000 of FIG. 4V. As shown, the front jaw 2000 may feature a working surface that can be customized to the shape of a work piece. Suitably, the front or work surface feature apertures 2200 along either end thereof so that a stage or stop offset 2100 (not shown; see FIG. 4AA) may be movably mounted at various vertical positions along the working surface of the front jaw 2000 for supporting work pieces at a desired vertical position during operation. Suitably, the back of the front jaw 2000 features keyhole connection slots, as discussed above. Suitably, a preferred embodiment of the front jaw 2000 is a four inch by two and a quarter inch by nine and an eighth inch "1018 cold rolled" bock that is otherwise dimensioned as shown in the drawings, where numbers in the form of: X.X have a tolerance of plus or minus 0.050; X.XX have a tolerance of plus or minus 0.030; and X.XXX have a tolerance of plus or minus 0.010.

FIG. 4AA is a perspective view of a stop offset 2100. FIG. 4BB is a left side view of the stop offset 2100 of FIG. 4AA. FIG. 4CC is a top view of the stop offset 2100 of FIG. 4AA. FIG. 4DD is a front view of the stop offset 2100 of FIG. 4AA. Suitably, the stop offset 2100 feature cooperates with the working surface of a front jaw 2000 (not shown) and apertures 2200 (not shown; see FIGS. V through Z) of the front jaw 2000 (not shown) along either end thereof said working surface so that the stop offset 2100 may be movably mounted at various vertical positions along the working surface of the front jaw 2000 for supporting work pieces at a desired vertical position during operation. Suitably, a preferred embodiment of the stop offset 2200 is a half inch by three quarters inch by nine and an eighth inch "1018 cold rolled" plate that is otherwise dimensioned as shown in the drawings, where numbers in the form of: X.X have a tolerance of plus or minus 0.050; X.XX have a tolerance of plus or minus 0.030; and X.XXX have a tolerance of plus or minus 0.010.

Figure 5:
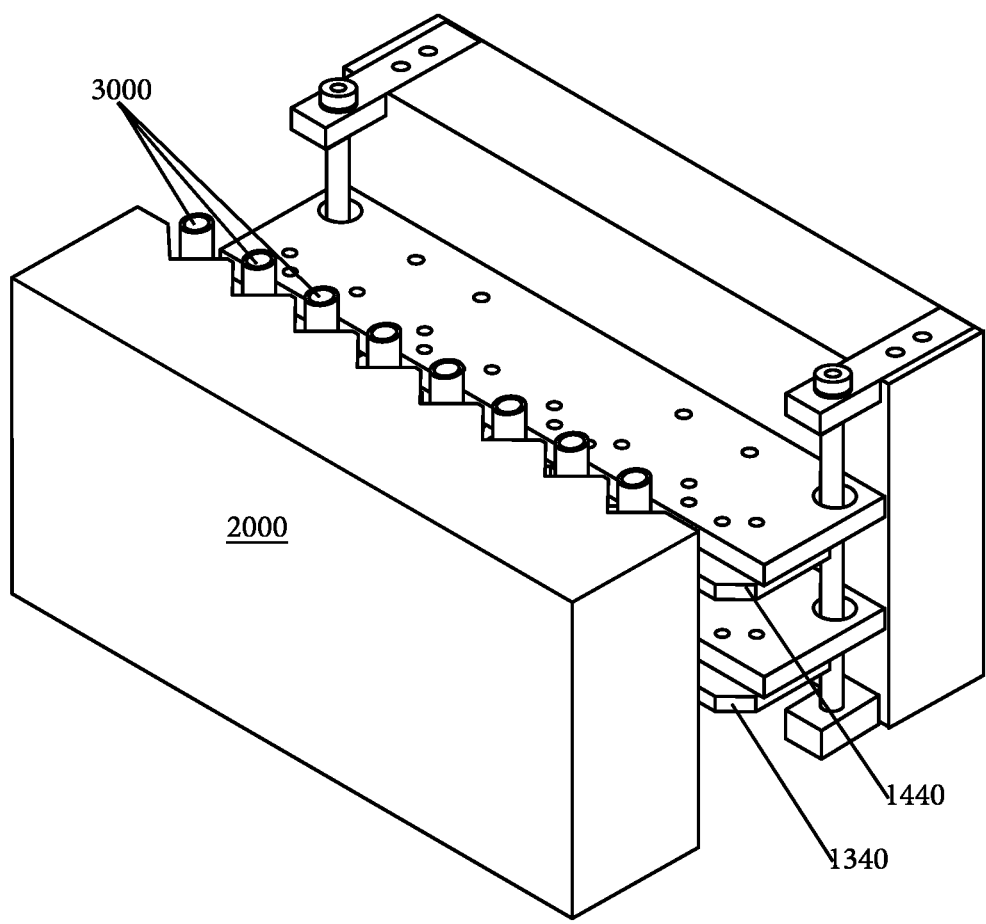
FIG. 5 is an environmental view of the compensating face plate 1000 of FIGS. 1 through 5.
Figure 6:
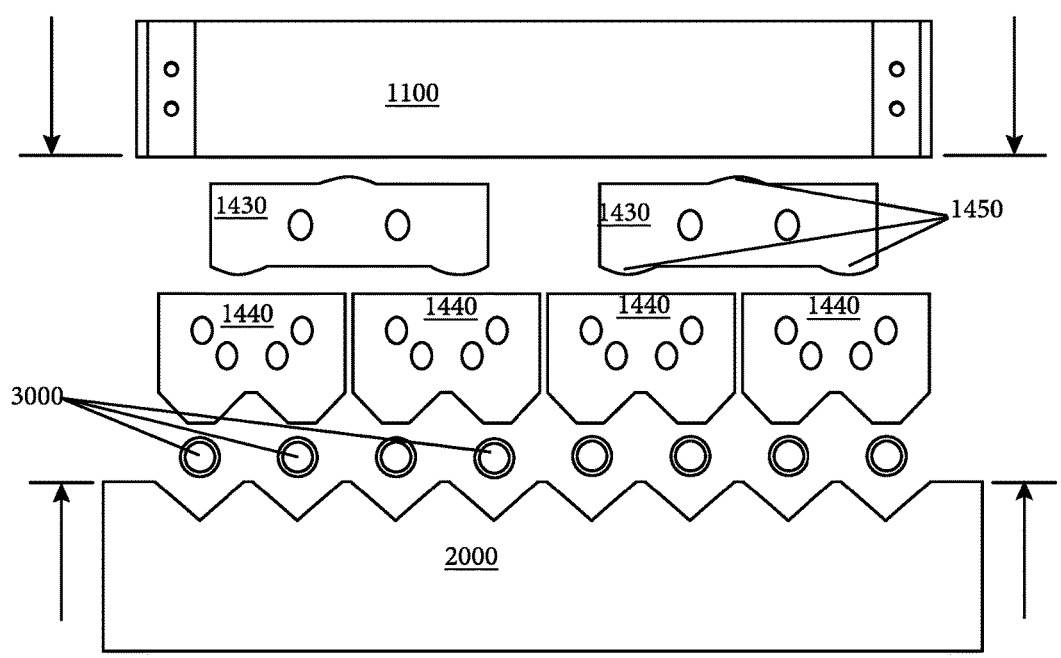
FIG. 6 is a diagram of the compensating face plate 1000 of FIG. 5.

FIG. 5 is an environmental view of the compensating face plate 1000 of FIGS. 1 through 5. As shown, the second stages of compensating members 1440, 1340 may each be used to secure two work pieces 3000 against the face plate 2000. FIG. 6 is a diagram of the compensating elements 1430, 1440 of the upper structure 1400 of the compensating face plate 1000 of FIG. 5. The compensating elements 1430 may also exemplify the operation of compensating elements 1330, 1340 of the lower structure 1300. Referring to FIG. 6, the nubs 1450 are substantially medially posited on the rear and on the front ends of the compensating elements 1430, 1440 wherein (a) the nubs 1450 on the rear of the first stage of compensating elements 1430 interface with the front face of the base 1100 while (b) the nubs 1450 of the on the front of the compensating elements 1430 interface with the back face of the compensating elements of the second stage of compensating elements 1440.

From the descriptions of FIGS. 1 through 5, it will be readily apparent that the first and second stages of the compensating elements (e.g., 1430, 1440) are operatively suspended in position from the carrier plates (e.g., 1420, 1430) by the several rivets or pins (e.g., 1432, 1442), and that the enlarged openings or bores (e.g., 1431, 1441) through the individual compensating members (e.g., 1430, 1440). It is to be noted however, that the pins or rivets (e.g., 1432, 1442) are of substantially smaller diameter than the respective openings (e.g., 1431, 1441) in the compensating jaw members (e.g., 1440, 1430) so that relative movement between the compensating elements (e.g., 1440, 1430) and the pins (e.g., 1442, 1432) in the plane between the panels (e.g., 1410, 1420) is enabled. This is to account for variations in size and slight variations in shape of several work pieces 3000 and to permit the shifting or pivoting of the compensating members (e.g., 1430, 1440) in any direction to accommodate for the variations within the work pieces 3000 and yet still permit pivoting of the compensating members (e.g., 1430, 1440) to exert a uniform and equal force on all of the work pieces 3000.

This above described operation is generally illustrated by FIG. 7, which is another diagram of the compensating face plate of FIG. 5 and illustrates the operation of the compensating face plate 1000. Referring first to FIGS. 7A and 7B, the second stage of compensating elements 1440 are configured to shift or pivot in response to interaction between the nubs 1450 and the front face of the first stage of compensating elements 1430. This pivoting or shifting is generally shown in broken lines. The first stage of compensating elements 1430 is similarly configured for pivoting in response to interactions with the front face of the base 1100. When so configured, each compensating panel in the first stage may be used to grip two work pieces against the face plate 2000, as shown in FIG. 7C.

Figure 8:
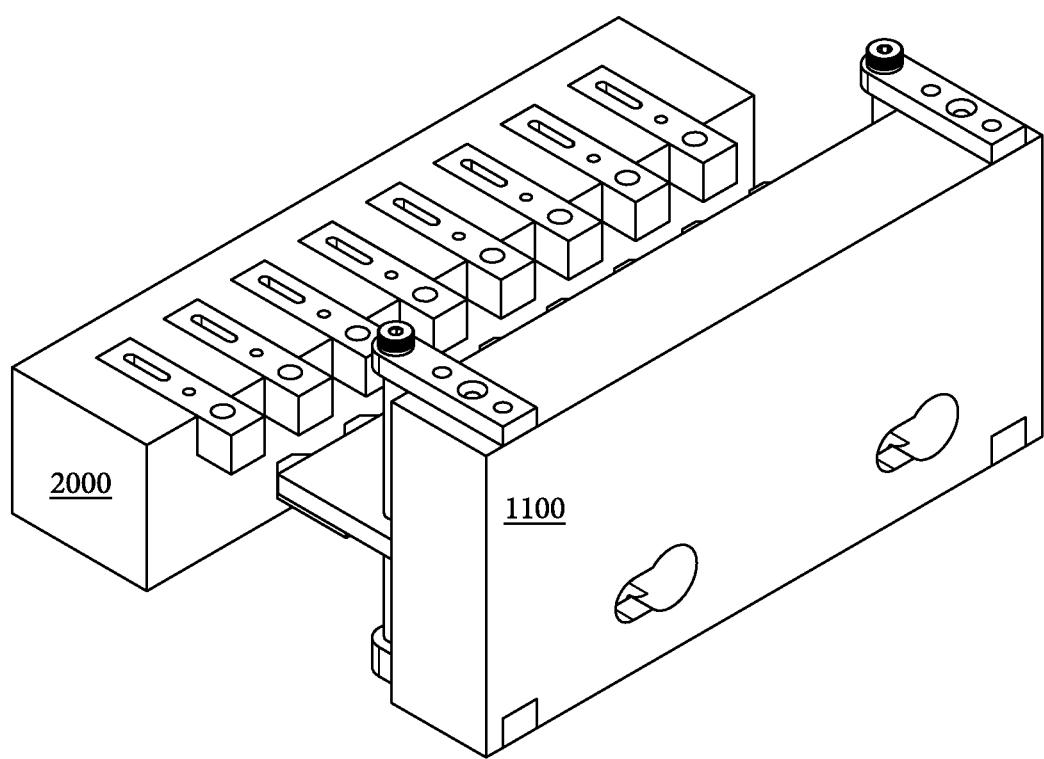
FIG. 8 is an alternate embodiment of a face plate 2000 used in connection with the compensating face plate 1000 of the earlier figures.

FIG. 8 is an alternate embodiment of a face plate 2000 used in connection with the compensating face plate 1000 of the earlier figures. In certain circumstances, it is desirable for the faceplate 2000 to be customized to the holding of certain work pieces and FIG. 8 illustrates a faceplate 2000 that has been so customized.

The utility model is described according to one embodiment. Without departing from the principles of the utility model, the device can be adjusted to accomplish various other embodiments. It should be pointed out that any technical solution or equivalent transformation all fall within the scope of the protection of utility models. It is to also be noted, however, that the appended figures illustrate only typical embodiments of the disclosed assemblies, and therefore, are not to be considered limiting of their scope, for the disclosed assemblies may admit to other equally effective embodiments that will be appreciated by those reasonably skilled in the relevant arts. Also, figures are not necessarily made to scale.

While the invention has been shown in a preferred embodiment, including a generally tubular or inverted truncated cone-shaped cup, it is recognized that departures may be made in the form of the cup and the mating matching rings to accommodate a square-shaped cup, for example; and it is further recognized that departures may be made from the invention as described within the spirit of this invention which is therefore not to be limited except as set forth in the claims which follow.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

We claim:

1. Jaws for a vise operationally configured to grip multiple work pieces at the same time, said jaws comprising:
    a compensating face plate assembly comprising:
        a base with at least one aperture disposed for securing the base to a first jaw of the vise;
        at least one dowel vertically secured to the front of a base via a joint that extends from the base;
        at least one carrier plate that is movably securable along the dowel and perpendicular relative to the base;
        a first stage of at least one compensating elements that is loosely suspended from and pivotally secured to said at least one carrier plate by a pin or rivet;
        a second stage of at least two compensating elements each of said compensating elements in the second stage being loosely suspended from and pivotally secured to said at least one carrier plate by a pin or rivet;
        one of said compensating elements of the second stage having at least one surface for interfacing a first workpiece;
        another one of said compensating elements of the second stage having at least one surface for interfacing a second workpiece;
        said compensating element of the first stage having a first nub that abuts the base, a second nub that abuts one of the compensating elements from the second stage, and a third nub that abuts another one of the compensating elements from the second stage; and,
    a face plate secured to a second jaw of the vise, said face plate with a first surface for interfacing the first workpiece and a second surface for interfacing the second workpiece.

2. The compensating face plate assembly of 1, wherein the base is removably secured to a movable vise jaw.

3. Vise jaws comprising:
    A compensating face plate assembly comprising: a base with at least one aperture;
    at least one dowel perpendicularly secured to the front of a base via a joint that extends from the base;
    an upper compensation structure defined by a first carrier plate and at least one set of compensation elements, wherein the carrier plate is secured to the base that is movably securable along the dowel and perpendicular relative to the base;

a first stage of at least one compensating elements that is loosely suspended from and pivotally secured to said at least one carrier plate by a pin or rivet;

a second stage of at least two compensating elements each of said compensating elements in the second stage being loosely suspended from and pivotally secured to said at least one carrier plate by a pin or rivet;

one of said compensating elements of the second stage having at least one surface for interfacing a first workpiece;

another one of said compensating elements of the second stage having at least one surface for interfacing a second workpiece;

said compensating element of the first stage having a first nub that abuts the base, a second nub that abuts one of the compensating elements from the second stage, and a third nub that abuts another one of the compensating elements from the second stage; and, a lower compensation structure defined by a second carrier plate and at least one stage of compensating elements, wherein the carrier plate is secured to the base via the dowel;

a face plate secured to a second jaw of the vise, said face plate with a first surface for interfacing the first workpiece and a second surface for interfacing the second workpiece.

4. The compensating face plate assembly of claim 3, wherein the stages of compensating elements are pivotally mounted between the upper plate and the lower plate.

5. The compensating face plate assembly of claim 3, wherein the compensating elements are pivotally mounted to the second carrier plate via fasteners that are smaller in diameter than at least one bore that is disposed along the compensating element.

* * * * *